United States Patent
Chou et al.

(10) Patent No.: US 9,325,899 B1
(45) Date of Patent: Apr. 26, 2016

(54) IMAGE CAPTURING DEVICE AND DIGITAL ZOOMING METHOD THEREOF

(71) Applicant: Altek Semiconductor Corp., Hsinchu (TW)

(72) Inventors: Hong-Long Chou, Hsinchu County (TW); Yi-Hong Tseng, Hsinchu (TW); Wen-Yan Chang, Miaoli County (TW); Yu-Chih Wang, Tainan (TW); Tsan-Wei Wang, Taitung County (TW); Yi-Yi Yu, Kaohsiung (TW)

(73) Assignee: Altek Semiconductor Corp., Hsinchu (TW)

( * ) Notice: Subject to any disclaimer, the term of this patent is extended or adjusted under 35 U.S.C. 154(b) by 0 days.

(21) Appl. No.: 14/571,021

(22) Filed: Dec. 15, 2014

(30) Foreign Application Priority Data

Nov. 13, 2014 (TW) .............................. 103139384 A (51) Int. Cl.
*H04N 5/345* (2011.01)
*H04N 5/265* (2006.01)
(Continued)

(52) U.S. Cl.
CPC .......... *H04N 5/23229* (2013.01); *G06T 3/0093* (2013.01); *G06T 3/40* (2013.01);
(Continued)

(58) Field of Classification Search
CPC . H04N 5/23229; H04N 5/265; H04N 5/2254; H04N 5/3454; G06T 3/0093; G06T 7/0051; G06T 3/40; G06T 2207/10004; G06T 2207/20228; G09G 2340/045
USPC ........... 348/240.1, 240.2, 240.3, 240.99, 335, 348/239, 314, 344; 382/215
See application file for complete search history.

(56) References Cited

U.S. PATENT DOCUMENTS

| 7,683,962 B2 | 3/2010 | Border et al. |
| 7,859,588 B2 | 12/2010 | Parulski et al. |

(Continued)

FOREIGN PATENT DOCUMENTS

| CN | 103814567 | 5/2014 |
| CN | 103888656 | 6/2014 |

(Continued)

OTHER PUBLICATIONS

"Office Action of Taiwan Counterpart Application," issued on Dec. 18, 2015, pp. 1-8, in which the listed references were cited.

*Primary Examiner* — Tuan Ho
*Assistant Examiner* — Marly Camargo
(74) *Attorney, Agent, or Firm* — J.C. Patents (57) ABSTRACT

An image capturing device and a digital zooming method thereof are proposed in the invention. The method includes the following steps. A scene is captured by a primary lens and a secondary lens to generate a primary image and a secondary image. Image rectification is then performed on the primary and the secondary images to obtain two corresponding rectified images. Feature points detected and matched from the two rectified images are used to determine a corresponding overlapping region, respectively. Pixel displacement and depth map in the two overlapping regions could be calculated and estimated. Image zooming and warping techniques are performed on the two rectified images to obtain corresponding warped images using a recalculated homography matrix according to each specific zooming factor. Finally, the two overlapping regions in the warped image are fused by a weighted blending approach to generate a digital zoomed image.

22 Claims, 6 Drawing Sheets

(51) Int. Cl.
 *H04N 5/232* (2006.01)
 *G06T 3/00* (2006.01)
 *G06T 3/40* (2006.01)
 *G06T 7/00* (2006.01)

(52) U.S. Cl.
 CPC ............. *G06T 7/0051* (2013.01); *H04N 5/265* (2013.01); *G06T 2207/10004* (2013.01); *G06T 2207/20228* (2013.01)

(56) References Cited

U.S. PATENT DOCUMENTS

| | | | |
|---|---|---|---|
| 8,553,106 | B2 | 10/2013 | Scarff |
| 2007/0025713 | A1* | 2/2007 | Hosono .................. G03B 17/12 396/72 |
| 2007/0053068 | A1* | 3/2007 | Yamamoto ......... H04N 5/23296 359/676 |
| 2007/0120988 | A1* | 5/2007 | Akiyama ............. H04N 5/2254 348/240.99 |
| 2008/0158346 | A1* | 7/2008 | Okamoto ........... H04N 5/23238 348/47 |
| 2010/0085468 | A1* | 4/2010 | Park ................... H04N 5/23296 348/345 |
| 2012/0206627 | A1* | 8/2012 | Reshidko ........... G02B 13/0045 348/240.2 |
| 2013/0076856 | A1* | 3/2013 | Wakabayashi ......... G03B 35/10 348/36 |

FOREIGN PATENT DOCUMENTS

| | | |
|---|---|---|
| TW | 472482 | 1/2002 |
| TW | 201217897 | 5/2012 |
| TW | 201330606 | 7/2013 |
| TW | I435160 | 4/2014 |

\* cited by examiner

IMAGE CAPTURING DEVICE AND DIGITAL ZOOMING METHOD THEREOF

CROSS-REFERENCE TO RELATED APPLICATION

This application claims the priority benefit of Taiwan application serial no. 103139384, filed on Nov. 13, 2014. The entirety of the above-mentioned patent application is hereby incorporated by reference herein and made a part of this specification.

BACKGROUND OF THE INVENTION

1. Field of the Invention

The invention generally relates to an image capturing device and a digital zooming method thereof, in particular, to an image capturing device with dual lenses and a digital zooming method thereof.

2. Description of Related Art

With development in technology, various smart image capturing devices, such as tablet computers, personal digital assistants and smart phones, have become indispensable tools for people nowadays. Camera lenses equipped in high-end smart image capturing devices provide same or better specifications than those of traditional consumer cameras, and some even provide three-dimensional image capturing features or near-equivalent pixel qualities to those of digital single lens reflex cameras.

When such image capturing devices perform digital zoom to enlarge an image, image blur and distortion may occur. In terms of a single lens, digital zoom is performed on a single image via an image processing technique. However, after the image is enlarged, it details may not be preserved. As a zooming factor increases, the image appears more blur and distorted.

On the other hand, in terms of dual lenses, the wide-angle lens may be used for capturing a wide-angle image, and the telephoto lens may be used for capturing a narrow-angle image. Either one of the wide-angle image and the narrow-angle image would be set as a target image for digital zoom. However, throughout the digital zooming process, if the target image needs to be switched to the other image, the viewed image may appear flickering or unsmooth.

Accordingly, to present an image that meets the user's expectation during an image digital process is one of the problems to be solved.

SUMMARY OF THE INVENTION

Accordingly, the invention is directed to an image capturing device and a digital zooming method thereof, where a digital zoomed image with high quality would be provided throughout a digital zooming process.

The invention is directed to a digital zooming method of an image capturing device, adapted to an image capturing device having a primary lens and a secondary lens. The method includes the following steps: capturing a scene by using the primary lens and the secondary lens to generate a primary image and a secondary image; performing image rectification on the primary image and the secondary image to generate a primary rectified image and a secondary rectified image; performing feature point detection on the primary rectified image and the secondary rectified image so as to detect overlapping regions respectively in the primary rectified image and the secondary rectified image, and further obtaining a plurality of pixel displacements and a depth map of the overlapping regions respectively in the primary rectified image and the secondary rectified image; when a zooming factor is between 1 and a primary-secondary image factor, performing image zooming and image warping on the primary rectified image and the secondary rectified image to generate a primary warped image and a secondary warped image according to the zooming factor, the pixel displacements, and the depth map, wherein the primary-secondary image factor is a ratio of the secondary rectified image to the primary rectified image; and performing image fusion on overlapping regions respectively in the primary warped image and the secondary warped image to generate a digital zoomed image.

According to an embodiment of the invention, the step of performing image rectification on the primary image and the secondary image to generate the primary rectified image and the secondary rectified image includes: obtaining a plurality of rectification parameters associated with the primary lens and the secondary lens; and rectifying the primary image and the secondary image to generate the primary rectified image and the secondary rectified image according to the rectification parameters.

According to an embodiment of the invention, the step of performing feature point detection on the primary rectified image and the secondary rectified image so as to detect the overlapping regions respectively in the primary rectified image and the secondary rectified image, and further obtaining the pixel displacements and the depth map of the overlapping regions respectively in the primary rectified image and the secondary rectified image includes: detecting a plurality of feature points from the primary rectified image and the secondary rectified image; identifying a plurality of feature point correspondences to calculate a homography matrix according to color information of a plurality of neighboring points of each of the feature points in the primary rectified image and the secondary rectified image; obtaining the overlapping regions respectively in the primary rectified image and the secondary rectified image according to the homography matrix and accordingly obtaining each of the pixel displacements; and performing stereo matching on each of the feature points in the primary rectified image and the secondary rectified image to obtain the depth map corresponding to each of the feature points.

According to an embodiment of the invention, the primary lens and the secondary lens have different fields of view and same distortion levels. The field of view of the primary lens is greater than the field of view of the secondary lens. The primary-secondary image factor is fixed and prior known. When the zooming factor is between 1 and the primary-secondary image factor, the step of performing image zooming and image warping on the primary rectified image and the secondary rectified image to generate the primary warped image and the secondary warped image according to the zooming factor, the pixel displacements, and the depth map includes: enlarging the primary rectified image to generate an enlarged primary rectified image according to the zooming factor; shrinking the secondary rectified image to generate a shrunken secondary rectified image according to the zooming factor; and performing image warping on the enlarged primary rectified image and the shrunken secondary rectified image to generate the primary warped image and the secondary warped image according to the pixel displacements and the depth map, wherein a warping level is associated with the depth map. When the zooming factor is less than 1, only the primary rectified image would be shrunken. When the zooming factor is greater than the primary-secondary image factor, only the secondary rectified image would be enlarged.

According to an embodiment of the invention, the primary lens and the secondary lens have same fields of view and same distortion levels. After the step of performing image rectification on the primary image and the secondary image to generate the primary rectified image and the secondary rectified image, the digital zooming method further includes: performing image binning on the primary rectified image to generate a binned primary rectified image; performing image cropping on the secondary rectified image to generate a cropped secondary rectified image, wherein a size of the binned primary rectified image and a size of the cropped secondary rectified image are the same; and setting the binned primary rectified image and the cropped secondary rectified image respectively as the primary rectified image and the secondary rectified image. When the zooming factor is between 1 and the primary-secondary image factor, the step of performing image zooming and image warping on the primary rectified image and the secondary rectified image to generate the primary warped image and the secondary warped image according to the zooming factor, the pixel displacements, and the depth map includes: enlarging the primary rectified image to generate an enlarged primary rectified image according to the zooming factor; shrinking the secondary rectified image to generate a shrunken secondary rectified image according to the zooming factor; and performing image warping on the enlarged primary rectified image and the shrunken secondary rectified image to generate the primary warped image and the secondary warped image according to the pixel displacements and the pixel depth map, wherein a warping level is associated with the depth map. When the zooming factor is less than 1, only the primary rectified image would be shrunken. When the zooming factor is greater than the primary-secondary image factor, only the secondary rectified image would be enlarged.

According to an embodiment of the invention, the primary lens and the secondary lens have same fields of view and different distortion levels, and the distortion level of the primary lens is much less than the distortion level of the secondary lens. After the step of performing image rectification on the primary image and the secondary image to generate the primary rectified image and the secondary rectified image, the method further includes: performing image cropping on a center region of the secondary rectified image to generate a cropped secondary rectified image; and setting the cropped secondary rectified image as the secondary rectified image. When the zooming factor is between 1 and the primary-secondary image factor, the step of performing image zooming and image warping on the primary rectified image and the secondary rectified image to generate the primary warped image and the secondary warped image according to the zooming factor, the pixel displacements, and the depth map includes: enlarging the primary rectified image to generate an enlarged primary rectified image according to the zooming factor; shrinking the secondary rectified image to generate a shrunken secondary rectified image according to the zooming factor; and performing image warping on the enlarged primary rectified image and the shrunken secondary rectified image to generate the primary warped image and the secondary warped image according to the pixel displacements and the pixel depth map, wherein a warping level is associated with the depth map. When the zooming factor is less than 1, only the primary rectified image would be shrunken. When the zooming factor is greater than the primary-secondary image factor, only the secondary rectified image would be enlarged.

According to an embodiment of the invention, the step of performing image fusion on the overlapping regions respectively in the primary warped image and the secondary warped image to generate the digital zoomed image includes: setting a first weight and a second weight respectively corresponding to the primary warped image and the secondary warped image according to the zooming factor; performing image fusion on the overlapping regions respectively in the primary warped image and the secondary warped image to generate a fused overlapping image based on the first weight and the second weight; and substituting the overlapping regions respectively in the primary warped image and the secondary warped image by the fused overlapping image to generate the digital zoomed image.

The invention is also directed to an image capturing device including a primary lens, a secondary lens, a storage unit, and at least one processing unit, where the processing unit is coupled to the lens and the storage unit. The storage unit is configured to record a plurality of modules. The processing unit is configured to access and execute the modules recorded in the storage unit. The modules include an image capturing module, an image preprocessing module, a feature analyzing module, an image zooming-warping module, and an image fusion module. The image capturing module is configured to capture a scene by using the primary lens and the secondary lens to generate a primary image and a secondary image. The image preprocessing module is configured to perform image rectification on the primary image and the secondary image to generate a primary rectified image and a secondary rectified image. The feature analyzing module is configured to perform feature point detection on the primary rectified image and the secondary rectified image so as to detect overlapping regions respectively in the primary rectified image and the secondary rectified image, and further obtain a plurality of pixel displacements and a depth map of the overlapping regions respectively in the primary rectified image and the secondary rectified image. The image zooming-warping module is configured to perform image zooming and image warping on the primary rectified image and the secondary rectified image to generate a primary warped image and a secondary warped image according to the zooming factor, the pixel displacements, and the depth map. The image fusion module is configured to perform image fusion on overlapping regions respectively in the primary warped image and the secondary warped image to generate a digital zoomed image.

According to an embodiment of the invention, the image preprocessing module obtains a plurality of rectification parameters associated with the primary lens and the secondary lens, and rectifies the primary image and the secondary image to generate the primary rectified image and the secondary rectified image according to the rectification parameters.

According to an embodiment of the invention, the feature analyzing module detects a plurality of feature points from the primary rectified image and the secondary rectified image, identifies a plurality of feature point correspondences to calculate a homography matrix according to color information of a plurality of neighboring points of each of the feature points in the primary rectified image and the secondary rectified image, obtains the overlapping regions respectively in the primary rectified image and the secondary rectified image according to the homography matrix and accordingly obtains each of the pixel displacements, and performs stereo matching on each of the feature point correspondences in the primary rectified image and the secondary rectified image to obtain the depth map.

According to an embodiment of the invention, the primary lens and the secondary lens have different fields of view and same distortion levels. The field of view of the primary lens is greater than the field of view of the secondary lens. The primary-secondary image factor is fixed and prior known. The image zooming-warping module enlarges the primary rectified image to generate an enlarged primary rectified image according to the zooming factor, shrinks the secondary rectified image to generate a shrunken secondary rectified image according to the zooming factor, and performs image warping on the enlarged primary rectified image and the shrunken secondary rectified image to respectively generate the primary warped image and the secondary warped image according to the pixel displacements and the depth map, wherein a warping level is associated with the depth map.

According to an embodiment of the invention, the primary lens and the secondary lens have same fields of view and same distortion levels. The image preprocessing module further performs image binning on the primary rectified image to generate a binned primary rectified image, performs image cropping on the secondary rectified image to generate a cropped secondary rectified image, and sets the binned primary rectified image and the cropped secondary rectified image respectively as the primary rectified image and the secondary rectified image, where a size of the binned primary rectified image and a size of the cropped secondary rectified image are the same. The image zooming-warping module enlarges the primary rectified image to generate an enlarged primary rectified image according to the zooming factor, shrinks the secondary rectified image to generate a shrunken secondary rectified image according to the zooming factor, and performs image warping on the enlarged primary rectified image and the shrunken secondary rectified image to respectively generate the primary warped image and the secondary warped image according to the pixel displacements and the depth map, wherein a warping level is associated with the depth map.

According to an embodiment of the invention, the primary lens and the secondary lens have same fields of view and different distortion levels, and the distortion level of the primary lens is much less than the distortion level of the secondary lens. A primary-secondary center image factor between a center region of the primary rectified image and a center region of the secondary rectified image is fixed and prior known. The image preprocessing module further performs image cropping on the center region of the secondary rectified image to generate a cropped secondary rectified image, and sets the cropped secondary rectified image as the secondary rectified image. The image zooming-warping module enlarges the primary rectified image to generate an enlarged primary rectified image according to the zooming factor, shrinks the secondary rectified image to generate a shrunken secondary rectified image according to the zooming factor, and performs image warping on the enlarged primary rectified image and the shrunken secondary rectified image to respectively generate the primary warped image and the secondary warped image according to the pixel displacements and the depth map, wherein a warping level is associated with the depth map.

According to an embodiment of the invention, the image fusion module sets a first weight and a second weight respectively corresponding to the primary warped image and the secondary warped image according to the zooming factor, performs image fusion on the overlapping regions respectively in the primary warped image and the secondary warped image to generate a fused overlapping image based on the first weight and the second weight, and substitutes the overlapping regions respectively in the primary warped image and the secondary warped image by the fused overlapping image to generate the digital zoomed image.

In summary, in the image capturing device and the digital zooming method proposed in the invention, by analyzing different imaging properties and distortion levels of the dual lenses, image zooming and image warping are automatically performed on images captured by the dual lenses according to a zooming factor to generate two warped images with similar focal lengths, sizes, and fields of view. The two warped images are fused by their weighted sum, and a digital zoomed image corresponding to the zooming factor would be obtained thereafter. As compared with the existing digital zooming techniques, the image capturing device and the digital zooming method proposed in the invention may provide a digital zoomed image with high quality throughout a digital zooming process.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts. In addition, the specifications and the like shown in the drawing figures are intended to be illustrative, and not restrictive. Therefore, specific structural and functional detail disclosed herein are not to be interpreted as limiting, but merely as a representative basis for teaching one skilled in the art to variously employ the invention.

Figure 1:
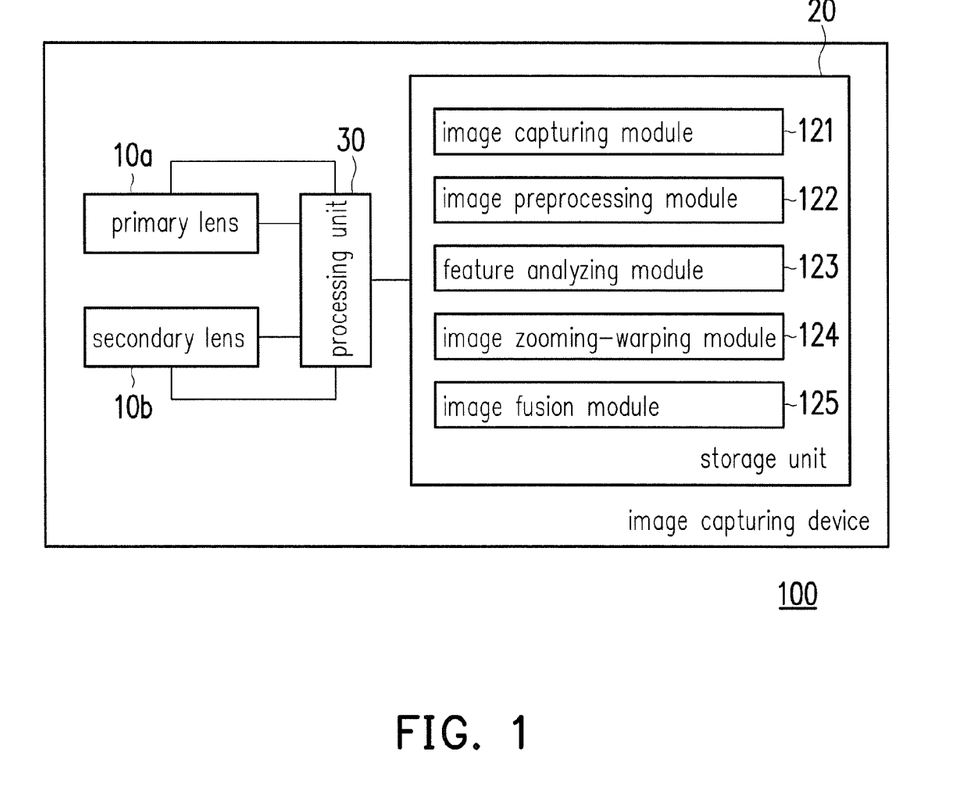
FIG. 1 illustrates a block diagram of an image capturing device according to an embodiment of the invention.

FIG. 1 illustrates a block diagram of an image capturing device according to an embodiment of the invention. It should, however, be noted that this is merely an illustrative example and the invention is not limited in this regard. All components of the image capturing device and their configurations are first introduced in FIG. 1. The detailed functionalities of the components are disclosed along with FIG. 2.

Referring to FIG. 1, an image capturing device 100 includes a primary lens 10*a*, a secondary lens 10*b*, a storage unit 20, and at least one processing units 30. In the present embodiment, the image capturing device 100 is, for example, a digital camera, a digital camcorder, a digital single lens reflex camera or other devices provided with an image capturing feature such as a smart phone, a tablet computer, a personal digital assistant, and so on. The invention is not limited herein.

The primary lens 10a and the secondary lens 10b include optical sensing elements for sensing light intensity entering the primary lens 10a and the secondary lens 10b to thereby generate images. The optical sensing elements are, for example, charge-coupled-device (CCD) elements, complementary metal-oxide semiconductor (CMOS) elements, and yet the invention is not limited thereto. Moreover, focal lengths, sensing sizes, fields of view, and distortion levels of the primary lens 10a and the secondary lens 10b may be the same or different. The invention is not limited herein.

The storage unit 20 may be one or a combination of a stationary or mobile random access memory (RAM), a read-only memory (ROM), a flash memory, a hard drive or other similar devices. The storage unit 20 is configured to record a plurality of modules executable by the processing unit 30, where the modules may be loaded into the processing unit 30 for performing digital zoom on an image captured by the image capturing device 100.

The processing unit 30 may be, for example, a central processing unit (CPU) or other programmable devices for general purpose or special purpose such as a microprocessor and a digital signal processor (DSP), a programmable controller, an application specific integrated circuit (ASIC), a programmable logic device (PLD) or other similar devices or a combination of above-mentioned devices. The processing unit 30 is coupled to the primary lens 10a, the secondary lens 10b, and the storage unit 20, and capable of accessing and executing the modules recorded in the storage unit 20.

The aforesaid modules include an image capturing module 121, an image preprocessing module 122, a feature analysing module 123, an image zooming-warping module 124, and an image fusion module 125, where the modules may be loaded into the processing unit 30 for digital zoom.

Figure 2:
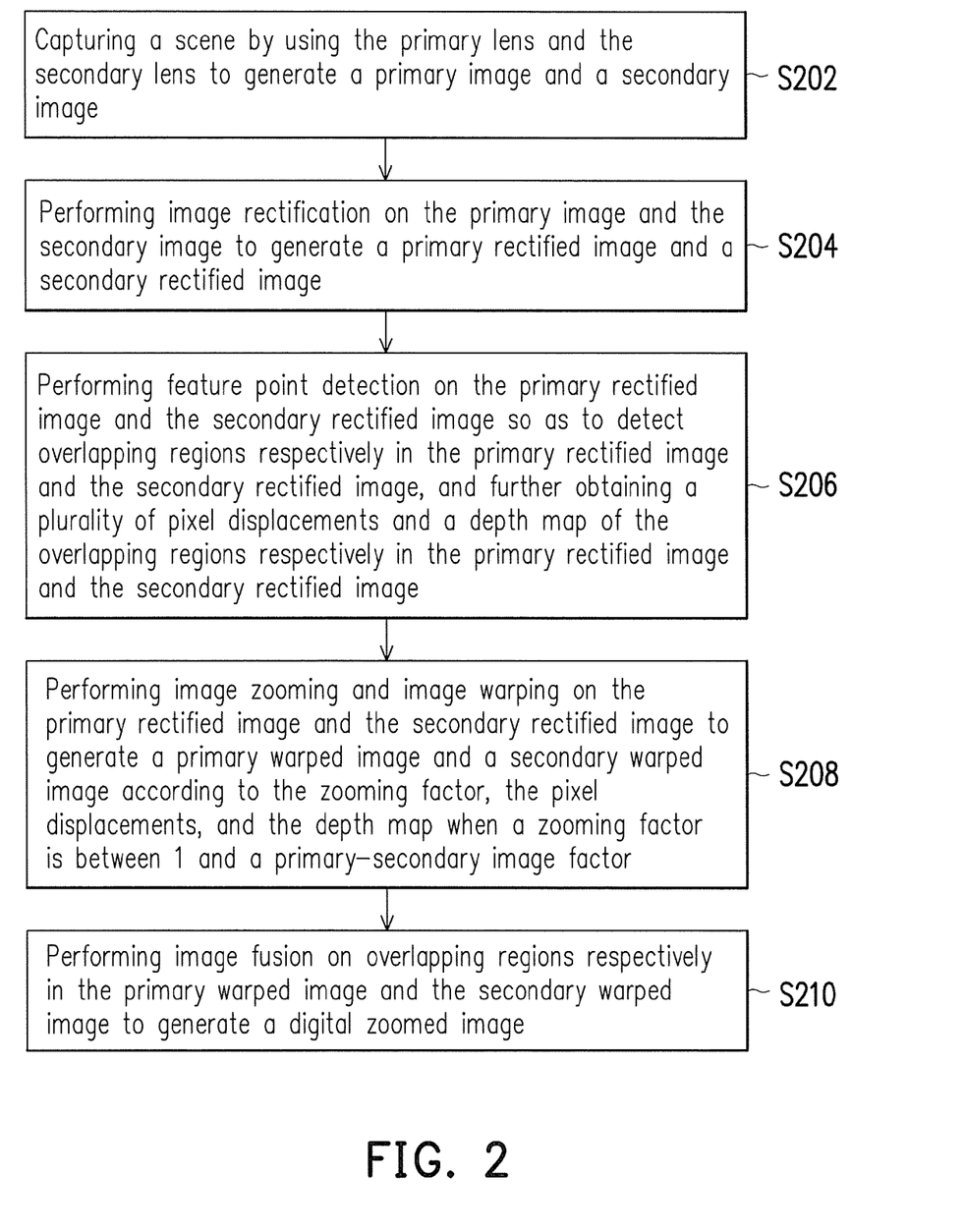
FIG. 2 illustrates a flowchart of a digital zooming method of an image capturing device according to an embodiment of the invention.

FIG. 2 illustrates a flowchart of a digital zooming method of an image capturing device according to an embodiment of the invention, and the method in FIG. 2 may be implemented by the components of the image capturing device 100 in FIG. 1.

Referring to both FIG. 1 and FIG. 2, the image capturing module 121 of the image capturing device 100 captures a scene by using the primary lens and the secondary lens to generate a primary image and a secondary image (Step S202). In other words, when the user desires to capture the scene by using the image capturing device 100, the image capturing module 121 would generate the primary image corresponding to the primary lens 10a and the secondary image corresponding to the secondary lens 10b. In the present embodiment, the primary image may be used for previewing purposes; it is an image with a lower quality and a larger field of view. On the other hand, the secondary image may not be used for previewing purposes; it is an image with a higher quality and a smaller field of view, and may be used as an auxiliary for digital zoom in the follow-up steps. More detailed information on the primary image and the secondary image will be given later on.

Next, the image preprocessing module 122 performs image rectification on the primary image and the secondary image to respectively generate a primary rectified image and a secondary rectified image (Step S204). To be specific, the image preprocessing module 122 may calibrate the shift amount of the brightness, the color, and the geometric position of each of the primary image and the secondary image respectively due to the primary lens 10a and the secondary lens 10b.

In the present embodiment, the image preprocessing module 122 may obtain a plurality of rectification parameters associated with the primary lens 10a and the secondary lens 10b. Such rectification parameters may be intrinsic parameters and extrinsic parameters of a camera for image rectification. The intrinsic parameters may be used for describing the transformation between camera coordinates and image coordinates. That is, the camera coordinates may be projected onto a projective plane according to the pinhole imaging principle. The intrinsic parameters may be, for example, focal length, image center, principal point, distortion coefficients, and so forth. The extrinsic parameters are used for describing the transformation between world coordinates and camera coordinates. The extrinsic parameters may be, for example, parameters in associated with the position and the viewing angle of the image capturing device 100 in a three-dimensional coordinate system such as a rotation matrix and a translation vector. The rectification parameters may also be parameters in associated with illumination compensation or color correction. The invention is not limited herein. The image preprocessing module 122 may rectify the primary image and the secondary image according to the aforesaid rectification parameters. The primary image and the secondary image being rectified may be referred to as a "primary rectified image" and a "secondary rectified image" respectively.

Next, the feature analyzing module 123 performs feature point detection on the primary rectified image and the secondary rectified image so as to detect overlapping regions respectively in the primary rectified image and the secondary rectified image, and further obtains a plurality of pixel displacements and a depth map of the overlapping regions respectively in the primary rectified image and the secondary rectified image (Step S206). Each of the overlapping regions is an overlapping portion between the field of view of the primary rectified image and that of the secondary rectified image.

To be specific, the feature analyzing module 123 may detect a plurality of feature points from the primary rectified image and the secondary rectified image by leveraging a feature detection algorithm such as edge detection, corner detection, blob detection, and so forth. Next, the feature analyzing module 123 may identify a plurality of feature point correspondences and obtain the overlapping regions respectively in the primary rectified image and the secondary rectified image.

In an embodiment, the feature analyzing module 123 may identify a plurality of feature point correspondences according to color information of a plurality of neighboring points of each of the feature points in the primary rectified image and the secondary rectified image so as to calculate a homography matrix. The feature analyzing module 123 may not only obtain the pixel displacements of the two overlapping regions via the homography matrix, but may also perform stereo matching due to the similar fields of view so as to estimate the depth map.

To be specific, the feature analyzing module 123 may determine the displacement and shift properties of each feature point correspondence to obtain the pixel displacements thereof. On the other hand, the feature analyzing module 123 may perform stereo matching on each of the feature point correspondences to obtain the pixel depth map. In other words, the feature analyzing module 123 may calculate the depth information of each of the feature point correspondences in the overlapping regions respectively in the primary rectified image and the secondary rectified image and store the depth information in a form of a depth map.

Next, when a zooming factor is between 1 and a primary-secondary image factor, the image zooming-warping module 124 performs image zooming and image warping on the primary rectified image and the secondary rectified image to generate a primary warped image and a secondary warped image according to the zooming factor, the pixel displacements, and the depth map (Step S208). The "primary-secondary image factor" is referred to as a ratio of the secondary rectified image to the primary rectified image, and is fixed and prior known. The "zooming factor" is an enlargement level to be adjusted on the primary rectified image; it may be set by the user or may be a default value of the image capturing device 100. The image zooming-warping module 124 may perform image zooming and image warping on the primary rectified image and the secondary rectified image according to the zooming factor as well as relative displacement, shift, and depth information between the two overlapping regions so as to generate two images with two overlapping regions having similar views and appearances, where the zooming factor of each of the two generated images also meets the user's need. Moreover, a warping level of each of the generated images is associated with the depth map. As the depth value increases, the warping level decreases; as the depth value decreases, the warping level increases. More details on the image zooming and image warping processes will be described in the follow-up embodiments.

Next, the image fusion module 125 performs image fusion on overlapping regions respectively in the primary warped image and the secondary warped image to generate a digital zoomed image (Step S210). To be specific, the image fusion module 125 may set a first weight and a second weight respectively corresponding to the primary warped image and the secondary warped image according to the zooming factor. Next, the image fusion module 125 may perform image fusion on each color pixel of the overlapping regions respectively in the primary warped image and the secondary warped image by a weighted sum based on the first weight and the second weight, where the resulting image is referred to as a "fused overlapping region." Then, the image fusion module 125 may substitute the overlapping region in the primary warped image by the fused overlapping image so as to generate the digital zoomed image with high quality.

In another embodiment, when the zooming factor is less than 1, the image zooming-warping module 124 may only shrink the primary rectified image to generate a shrunken primary rectified image. Next, the image zooming-warping module 124 may perform image warping on the shrunken primary rectified image to generate the primary warped image and set the primary warped image as the digital zoomed image. On the other hand, when the zooming factor is greater than the primary-secondary image factor, the image zooming-warping module 124 may enlarge the secondary rectified image to generate an enlarged secondary rectified image according to the zooming factor. Next, the image zooming-warping module 124 may perform image warping on the shrunken secondary rectified image to generate the secondary warped image and set the secondary rectified image as the digital zoomed image.

The image capturing device proposed in the invention may be adapted to different sets of lenses. The digital zooming method corresponding to three different sets of lenses will be illustrated hereinafter.

Figure 3:
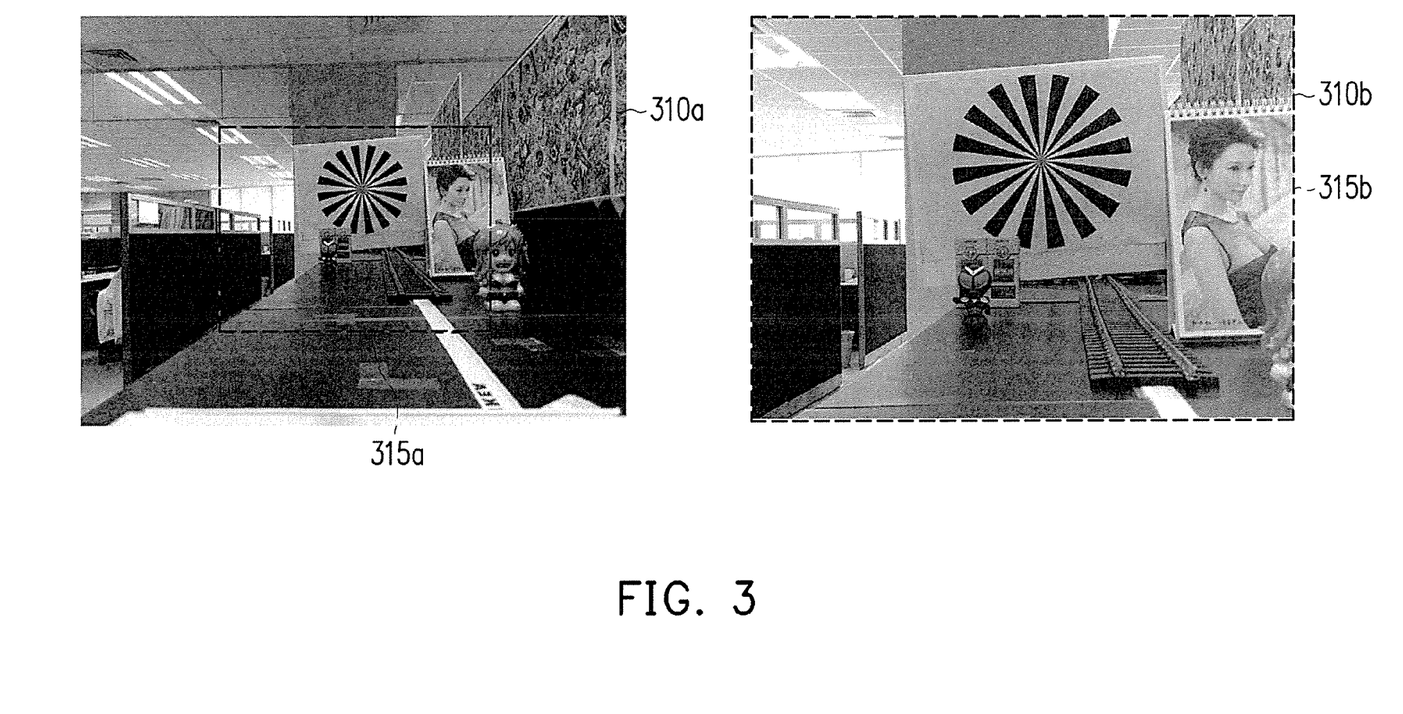
FIG. 3 is a schematic diagram of a primary rectified image and a secondary rectified image according to an embodiment of the invention.

FIG. 3 is a schematic diagram of a primary rectified image and a secondary rectified image according to an embodiment of the invention. It should be noted that, the primary lens 10a and the secondary lens 10b have different fields of view and same distortion levels, where the field of view of the primary lens is greater than that of the secondary lens. Herein, the field of view of the primary image is greater than that of the secondary image, and yet an image quality of the secondary image surpasses that of the primary image. In other words, the primary image and the secondary image are respectively a wide-angle image and a narrow-angle image, and thus the secondary image is larger and presented with clarity. However, the secondary image is used as an auxiliary for digital zoom but not used for previewing purposes.

Referring to FIG. 3, after the image capturing module 122 captures a primary image and a secondary image by using the primary lens 10a and the secondary lens 10b, the image preprocessing module 122 may perform image rectification on the primary image and the secondary image to generate a primary rectified image 310a and a secondary rectified image 310b. A region 315a and a region 315b are two overlapping regions detected respectively from the primary rectified image 310a and the secondary image 310b by the feature analyzing module 123. In the present embodiment, since the secondary rectified image 310b is a narrow-angle image, the secondary rectified image 310 and the overlapping region 315b in the secondary rectified image 310b are the same. That is, the entire secondary rectified image 310b and the overlapping region 315a in the primary rectified image 310a would be identical.

In the present embodiment, the image zooming-warping module 124 may enlarge the primary rectified image to generate an enlarged primary rectified image according to the zooming factor. Throughout the enlargement process, a center region of the primary rectified image would gradually alike to the secondary rectified image. The image zooming-warping module 124 may further shrink the secondary rectified image to generate a shrunken secondary rectified image according to the zooming factor. Next, the image zooming-warping module 124 may perform image warping on the enlarged primary rectified image and the shrunken secondary rectified image to generate a primary warped image and a secondary warped image according to the pixel displacements and the depth map.

The image fusion module 125 may set a first weight and a second weight respectively corresponding to the primary warped image and the secondary warped image according to a zooming factor. The first weight and the second weight are allocated based on a zooming factor and a factor corresponding to each of the primary image and the secondary image. In the present embodiment, assume that the factors corresponding to the primary image and the secondary image are respectively 1 and 2. When the zooming factor is 1 (i.e., the median of 1 and 2), the image fusion module 125 would set the first weight and the second weight respectively to 0.5. In another embodiment, when the zooming factor is 1.2, the image fusion module 125 would set the first weight and the second weight respectively to 0.8 and 0.2. However, the image fusion module 125 is not restricted to set the two weights based on a linear relationship. In other embodiments, the image fusion module 125 may set the two weights based on other formulas. The invention is not limited herein. After performing image fusion, the image fusion module 125 may generate a digital zooming image which is a relatively smooth, clear, and enlarged image.

Figure 4:
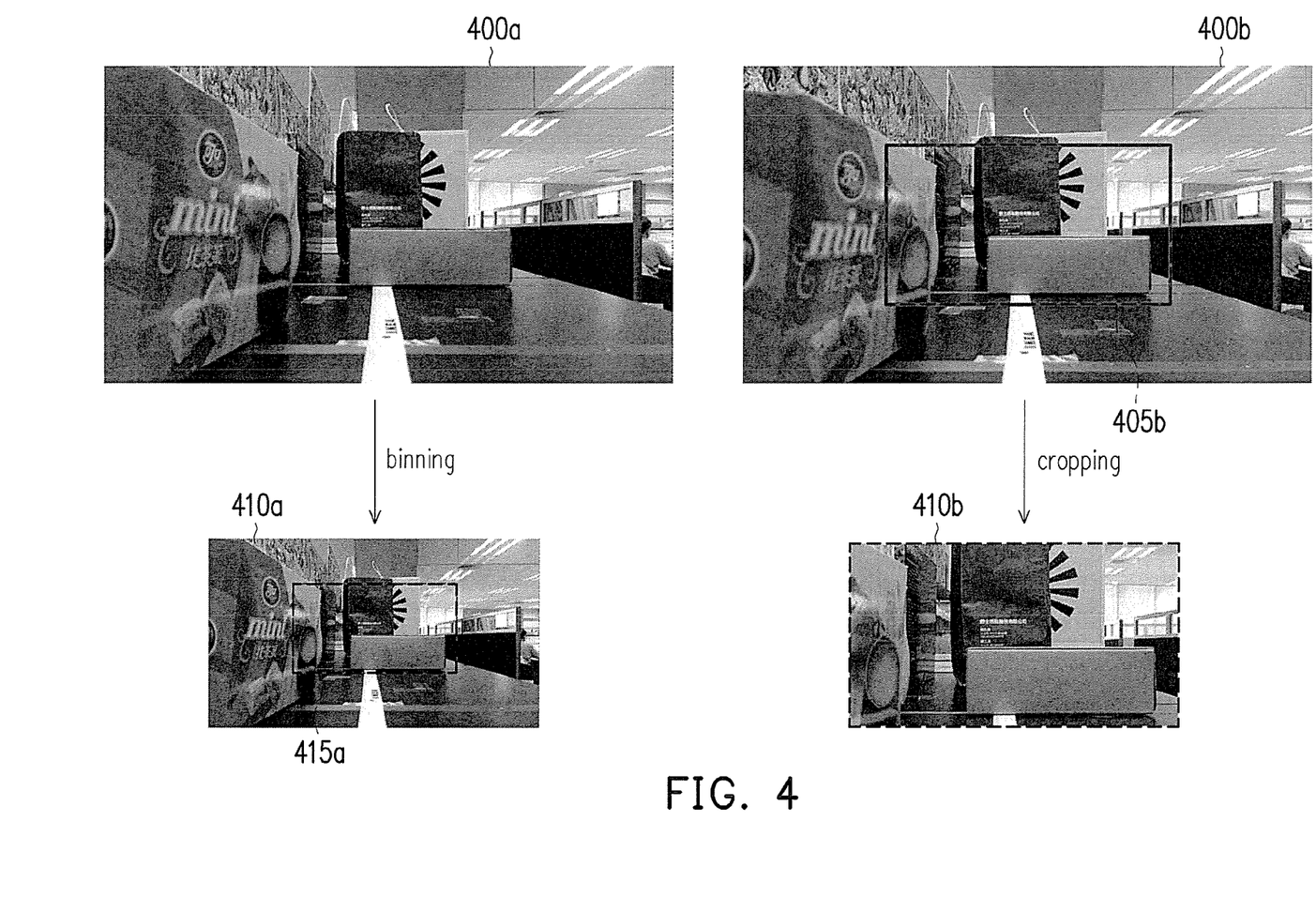
FIG. 4 is a schematic diagram of a primary rectified image and a secondary rectified image according to another embodiment of the invention.

FIG. 4 is a schematic diagram of a primary rectified image and a secondary rectified image according to another embodiment of the invention.

Referring to FIG. 4, in the present embodiment, the primary lens 10a and the secondary lens 10b of the image capturing device 100 have same fields of view and distortion levels. Hence, the field of view in the primary image and that in the secondary image captured by the primary lens 10a and the secondary lens 10b are the same. In the present embodiment, the image preprocessing module 122 of the image capturing device 100 may perform image binning and image cropping on a primary rectified image 400a and a secondary rectified image 400b to generate two images with different fields of view. Additionally, the embodiment is adapted to a digital photo-shooting equipment with a thumbnail image preview feature.

To be specific, the image preprocessing module 122 may perform image binning on the primary rectified image to generate a binned primary rectified image 410a with a smaller size. In an embodiment, the size of the binned primary rectified image 410a may be ¼ of the size of the primary rectified image 400a. In other words, the image preprocessing 122 may perform 2×2 pixel binning on the primary rectified image 400a to bin each four neighboring pixels of the primary image 400a into one and thereby generate the binned primary rectified image 410a. As compared with the primary rectified image 400a, the binned primary rectified image 410a may be transferred faster and yet with a lower resolution.

On the other hand, the image preprocessing module 122 may perform image cropping on the secondary rectified image to generate a cropped secondary rectified image 410a. In the present embodiment, the size of the cropped secondary rectified image 410b may also be ¼ of the size of the secondary rectified image 400b. In other words, the image preprocessing module 122 may crop a center region 405b with ¼ of the size of the secondary rectified image 400b and thereby generate the cropped secondary rectified image 410b.

Hence, the image preprocessing module 122 may simulate the binned primary rectified image 410a and the secondary rectified image 400b with same sizes and different field of views, and further set the binned primary rectified image and the cropped secondary rectified image respectively as the primary rectified image and the secondary rectified image. Next, similar image processing steps as illustrated in FIG. 3 may be performed on the redefined primary rectified image and secondary rectified image to generate a digital zoomed image, where a region 415a in the binned primary rectified image 410a and the cropped secondary rectified image 410b are two overlapping regions. Details on the image processing steps may refer to the related description in the previous paragraphs and may not be repeated herein.

Figure 5:
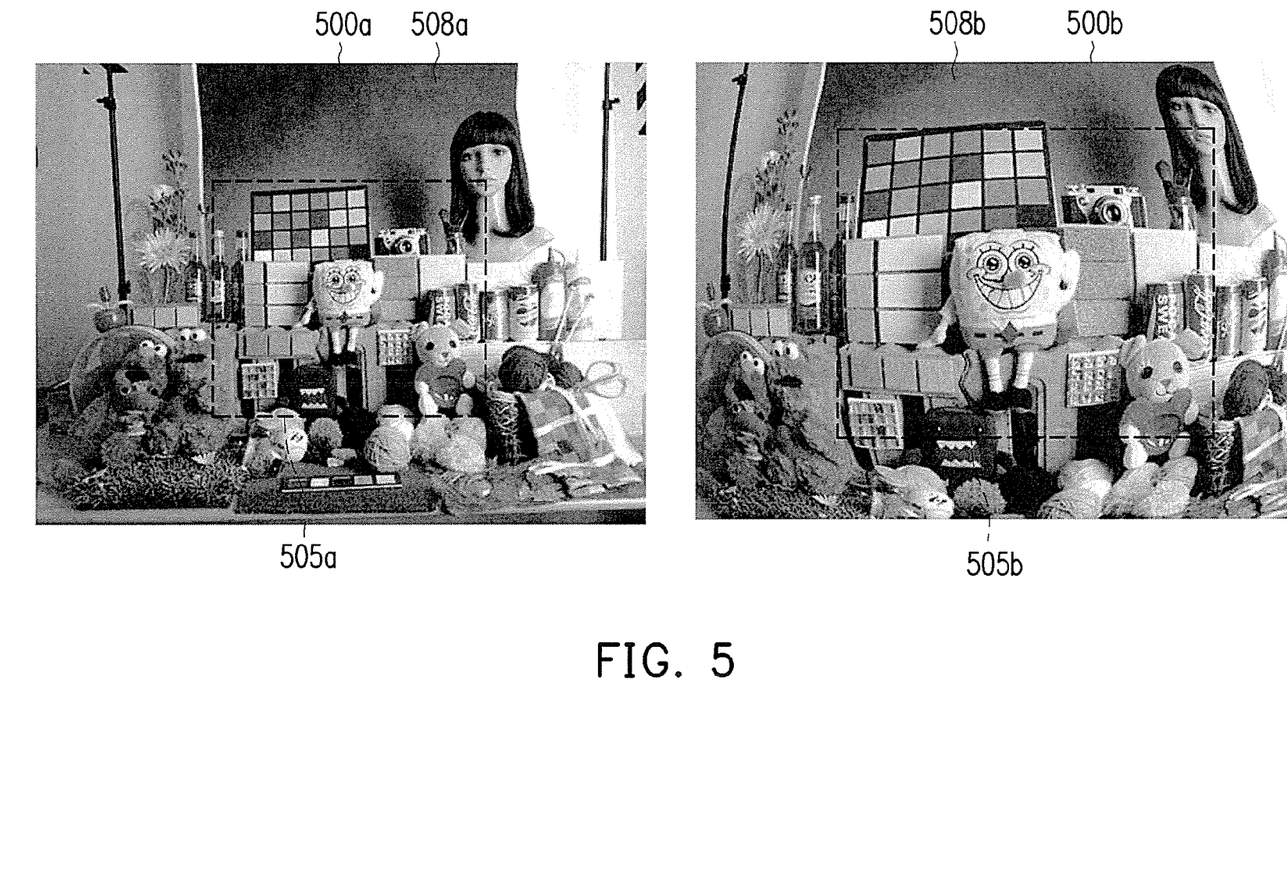
FIG. 5 is a schematic diagram of a primary image and a secondary image according to an embodiment of the invention.

FIG. 5 is a schematic diagram of a primary image and a secondary image according to an embodiment of the invention. It should be noted that, in the present embodiment, the primary lens 10a and the secondary lens 10b have same fields of view and different distortion levels, where the distortion level of the primary lens is much less than that of the secondary lens. In the present embodiment, the primary lens 10a is a lens with no special distortion while the secondary lens 10b is a distorted lens with a special design.

Referring to FIG. 5, in the present embodiment, a primary image 500a captured by the primary lens 10a of the image capturing module 121 is a normal image. A secondary image 500b captured by the secondary lens 10b of the image capturing module 121 is an image with distortion. What is special is that a center region of an original scene (e.g., a region 505a in the primary image 500a) may be projected onto a center region of the sensing elements of the secondary lens 10b with a larger proportion. Such center region may result in a region 505b in the secondary image 500b having a lower distortion level. On the other hand, an outer region of the original scene (e.g., a region 508a in the primary image 500a) may be projected onto a remaining outer region of the sensing elements of the secondary lens 10b. Such outer region may result in a region 508b in the secondary image 500b having a higher distortion level.

Next, the image preprocessing module 122 may perform image rectification on the primary 500a and the secondary image 500b to generate a primary rectified image and a secondary rectified image. The image preprocessing module 122 may crop the larger proportion of the center region in the primary rectified image (i.e., the region corresponding to the region 505b of the secondary image) to generate a cropped secondary rectified image, and further set the cropped secondary rectified image as the secondary rectified image. The secondary rectified image has a relatively smaller field of view as compared with the primary rectified image, and yet has a higher resolution. The image zooming-warping module 124 may enlarge the primary rectified image to generate an enlarged primary rectified image and shrink the secondary rectified image to generate a shrunken secondary rectified image according to the zooming factor. Next, the image zoom-warping module 124 may perform image warping on the enlarged primary rectified image and the shrunken secondary rectified image to respectively generate the primary warped image and the secondary warped image according to the pixel displacements and the depth map of the overlapping regions obtained from the feature analyzing module 123.

It should be noted that, since the secondary rectified image and the primary rectified image have the same fields of view, after lens distortion correction is performed on the outer region 508b in the secondary image 500b, the image capturing device 100 may perform depth estimation on the entire primary rectified image by using the secondary rectified image and the corrected secondary image.

Figure 6:
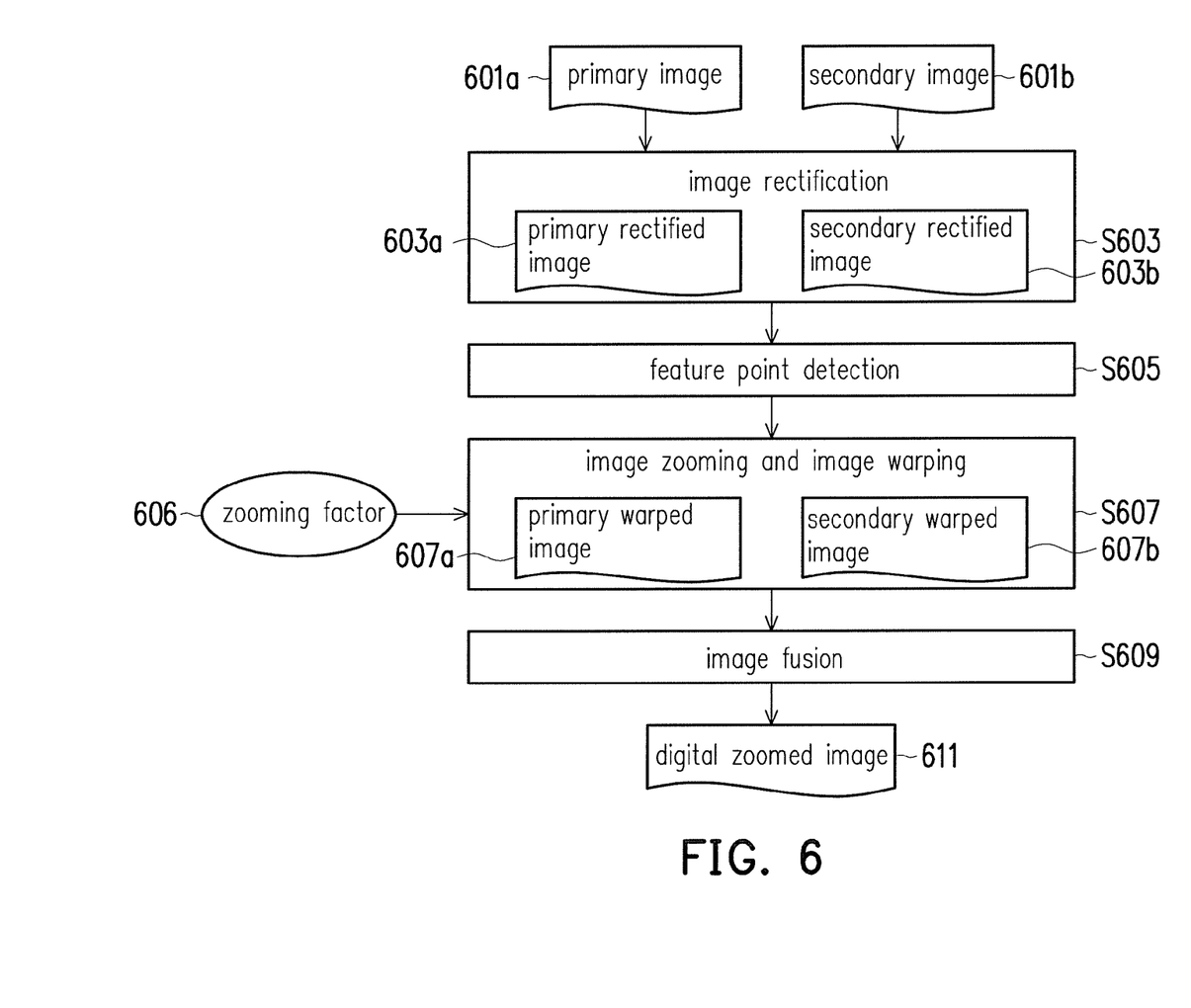
FIG. 6 illustrates a functional block diagram of a digital zooming method of an image capturing device according to an embodiment of the invention.

The aforesaid digital zooming method of the image processing device may be summarized by a functional block diagram as illustrated in FIG. 6 according to an embodiment of the invention.

Referring to FIG. 6, in the proposed method, the image capturing device 100 may capture a scene by using the primary lens 10a and the secondary lens 10b to generate a primary image 601a and a secondary image 601b. Next, image rectification S603 may be performed on the primary image 601a and the secondary image 610b to respectively generate a primary rectified image 603a and a secondary rectified image 603b. Feature point detection S605 may then be performed on the primary rectified image 603a and the secondary rectified image 603b to obtain pixel displacements and a depth map of overlapping regions respectively in the two images. Next, image zooming and image warping S607 may be performed on the primary rectified image 603a and the secondary rectified image 603b according to a zooming factor 606 as well as the pixel displacements and the pixel depth map obtained from feature detection S605 to generate a primary warped image 607a and a secondary warped image 607b. Finally, image fusion may be performed on the primary warped image 607a and the secondary warped image 607b, and a smooth and clear digital zoomed image 611 may be output thereafter.

In summary, in the image capturing device and the digital zooming method proposed in the invention, by analyzing different imaging properties and distortion levels of the dual lenses, image zooming and image warping are automatically performed on images captured by the dual lenses according to a zooming factor to generate two warped images with similar focal lengths, sizes, and fields of view. The two warped images are fused by their weighted sum, and a digital zoomed image corresponding to the zooming factor would be obtained thereafter. As compared with the existing digital zooming techniques, the image capturing device and the digital zooming method proposed in the invention may provide a digital zoomed image with high quality throughout a digital zooming process.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A digital zooming method, adapted to an image capturing device having a primary lens and a secondary lens, comprising:

capturing a scene by using the primary lens and the secondary lens to generate a primary image and a secondary image;

performing image rectification on the primary image and the secondary image to generate a primary rectified image and a secondary rectified image;

performing feature point detection on the primary rectified image and the secondary rectified image so as to detect overlapping regions respectively in the primary rectified image and the secondary rectified image, and further obtaining a plurality of pixel displacements and a depth map of the overlapping regions respectively in the primary rectified image and the secondary rectified image;

when a zooming factor is between 1 and a primary-secondary image factor, performing image zooming and image warping on the primary rectified image and the secondary rectified image to generate a primary warped image and a secondary warped image according to the zooming factor, the pixel displacements, and the depth map, wherein the primary-secondary image factor is a ratio of the secondary rectified image to the primary rectified image; and performing image fusion on overlapping regions respectively in the primary warped image and the secondary warped image to generate a digital zoomed image.

2. The digital zooming method of claim 1, wherein the step of performing image rectification on the primary image and the secondary image to generate the primary rectified image and the secondary rectified image comprises:

obtaining a plurality of rectification parameters associated with the primary lens and the secondary lens; and rectifying the primary image and the secondary image to generate the primary rectified image and the secondary rectified image according to the rectification parameters.

3. The digital zooming method of claim 1, wherein the step of performing feature point detection on the primary rectified image and the secondary rectified image so as to detect the overlapping regions respectively in the primary rectified image and the secondary rectified image, and further obtaining the pixel displacements and the depth map of the overlapping regions respectively in the primary rectified image and the secondary rectified image comprises:

detecting a plurality of feature points from the primary rectified image and the secondary rectified image;

identifying a plurality of feature point correspondences to calculate a homography matrix according to color information of a plurality of neighboring points of each of the feature points in the primary rectified image and the secondary rectified image;

obtaining the overlapping regions respectively in the primary rectified image and the secondary rectified image according to the homography matrix and accordingly obtaining each of the pixel displacements; and performing stereo matching on each of the feature point correspondences in the primary rectified image and the secondary rectified image to obtain the depth map.

4. The digital zooming method of claim 1, wherein the primary lens and the secondary lens have different fields of view and same distortion levels, wherein the field of view of the primary lens is greater than the field of view of the secondary lens, and wherein when the zooming factor is between 1 and the primary-secondary image factor, the step of performing image zooming and image warping on the primary rectified image and the secondary rectified image to generate the primary warped image and the secondary warped image according to the zooming factor, the pixel displacements, and the depth map comprises:

enlarging the primary rectified image to generate an enlarged primary rectified image according to the zooming factor;

shrinking the secondary rectified image to generate a shrunken secondary rectified image according to the zooming factor; and performing image warping on the enlarged primary rectified image and the shrunken secondary rectified image to generate the primary warped image and the secondary warped image according to the pixel displacements and the depth map, wherein a warping level is associated with the depth map.

5. The digital zooming method of claim 1, wherein the primary lens and the secondary lens have same fields of view and same distortion levels, and wherein after the step of performing image rectification on the primary image and the secondary image to generate the primary rectified image and the secondary rectified image, the digital zooming method further comprises:

performing image binning on the primary rectified image to generate a binned primary rectified image;

performing image cropping on the secondary rectified image to generate a cropped secondary rectified image, wherein a size of the binned primary rectified image and a size of the cropped secondary rectified image are the same; and setting the binned primary rectified image and the cropped secondary rectified image respectively as the primary rectified image and the secondary rectified image.

6. The digital zooming method of claim 1, wherein when the zooming factor is between 1 and the primary-secondary image factor, the step of performing image zooming and image warping on the primary rectified image and the secondary rectified image to generate the primary warped image and the secondary warped image according to the zooming factor, the pixel displacements, and the depth map comprises:

enlarging the primary rectified image to generate an enlarged primary rectified image according to the zooming factor;

shrinking the secondary rectified image to generate a shrunken secondary rectified image according to the zooming factor; and performing image warping on the enlarged primary rectified image and the shrunken secondary rectified image to generate the primary warped image and the secondary warped image according to the pixel displacements and the pixel depth map, wherein a warping level is associated with the depth map.

7. The digital zooming method of claim 1, wherein the primary lens and the secondary lens have same fields of view and different distortion levels, wherein the distortion level of the primary lens is much less than the distortion level of the secondary lens, and wherein after the step of performing image rectification on the primary image and the secondary image to generate the primary rectified image and the secondary rectified image, the digital zooming method further comprises:

performing image cropping on a center region of the secondary rectified image to generate a cropped secondary rectified image; and     setting the cropped secondary rectified image as the secondary rectified image.

8. The digital zooming method of claim 7, wherein when the zooming factor is between 1 and the primary-secondary image factor, the step of performing image zooming and image warping on the primary rectified image and the secondary rectified image to generate the primary warped image and the secondary warped image according to the zooming factor, the pixel displacements, and the depth map comprises:

enlarging the primary rectified image to generate an enlarged primary rectified image according to the zooming factor;

shrinking the secondary rectified image to generate a shrunken secondary rectified image; and     performing image warping on the enlarged primary rectified image and the shrunken secondary rectified image to generate the primary warped image and the secondary warped image according to the pixel displacements and the depth map, wherein a warping level is associated with the depth map.

9. The digital zooming method of claim 1, wherein the step of performing image fusion on the overlapping regions respectively in the primary warped image and the secondary warped image to generate the digital zoomed image comprises:

setting a first weight and a second weight respectively corresponding to the primary warped image and the secondary warped image according to the zooming factor;

performing image fusion on the overlapping regions respectively in the primary warped image and the secondary warped image to generate a fused overlapping image based on the first weight and the second weight; and     substituting the overlapping regions respectively in the primary warped image and the secondary warped image by the fused overlapping image to generate the digital zoomed image.

10. The digital zooming method of claim 1, wherein when the zooming factor is greater than the primary-secondary image factor, the digital zooming method further comprises:

enlarging the secondary rectified image to generate an enlarged secondary rectified image according to the zooming factor;

performing image warping on the shrunken secondary rectified image to generate the secondary warped image according to the pixel displacements and the depth map, wherein a warping level is associated with the depth map; and     setting the secondary warped image as the digital zoomed image.

11. The digital zooming method of claim 1, wherein when the zooming factor is less than 1, the digital zooming method further comprises:

shrinking the primary rectified image to generate a shrunken primary rectified image;

performing image warping on the shrunken primary rectified image to generate the primary warped image according to the pixel displacements and the pixel depth map, wherein a warping level is associated with the depth map; and     setting the primary warped image as the digital zoomed image.

12. An image capturing device comprising:

a primary lens;

a secondary lens;

a storage unit, recording a plurality of modules; and one or more processing unit, coupled to the primary lens, the secondary lens and the storage unit, and accessing and executing the modules recorded in the storage unit, wherein the modules comprise:

an image capturing module, capturing a scene by using the primary lens and the secondary lens to generate a primary image and a secondary image;

an image preprocessing module, performing image rectification on the primary image and the secondary image to generate a primary rectified image and a secondary rectified image;

a feature analyzing module, performing feature point detection on the primary rectified image and the secondary rectified image so as to detect overlapping regions respectively in the primary rectified image and the secondary rectified image, and further obtaining a plurality of pixel displacements and a depth map of the overlapping regions respectively in the primary rectified image and the secondary rectified image;

an image zooming-warping module, when a zooming factor is between 1 and a primary-secondary image factor, performing image zooming and image warping on the primary rectified image and the secondary rectified image to generate a primary warped image and a secondary warped image according to the zooming factor, the pixel displacements, and the depth map, wherein the primary-secondary image factor is a ratio of the secondary rectified image to the primary rectified image; and         an image fusion module, performing image fusion on overlapping regions respectively in the primary warped image and the secondary warped image to generate a digital zoomed image.

13. The image capturing device of claim 12, wherein the image preprocessing module obtains a plurality of rectification parameters associated with the primary lens and the secondary lens, and rectifies the primary image and the secondary image to generate the primary rectified image and the secondary rectified image according to the rectification parameters.

14. The image capturing device of claim 12, wherein the feature analyzing module detects a plurality of feature points from the primary rectified image and the secondary rectified image, identifies a plurality of feature point correspondences to calculate a homography matrix according to color information of a plurality of neighboring points of each of the feature points in the primary rectified image and the secondary rectified image, obtains the overlapping regions respectively in the primary rectified image and the secondary rectified image according to the homography matrix and accordingly obtains each of the pixel displacements, and performs stereo matching on each of the feature point correspondences in the primary rectified image and the secondary rectified image to obtain the depth map.

15. The image capturing device of claim 12, wherein the primary lens and the secondary lens have different fields of view and same distortion levels, wherein the field of view of the primary lens is greater than the field of view of the secondary lens, and wherein when the zooming factor is between 1 and the primary-secondary image factor, the image zooming-warping module enlarges the primary rectified image to generate an enlarged primary rectified image according to the zooming factor, shrinks the secondary rectified image to generate a shrunken secondary rectified image according to the zooming factor, and performs image warping on the enlarged primary rectified image and the shrunken secondary rectified image to respectively generate the primary warped image and the secondary warped image according to the pixel displacements and the depth map, wherein a warping level is associated with the depth map.

16. The image capturing device of claim 12, wherein the primary lens and the secondary lens have same fields of view and same distortion levels, and the image preprocessing module further performs image binning on the primary rectified image to generate a binned primary rectified image, performs image cropping on the secondary rectified image to generate a cropped secondary rectified image, and sets the binned primary rectified image and the cropped secondary rectified image respectively as the primary rectified image and the secondary rectified image, wherein a size of the binned primary rectified image and a size of the cropped secondary rectified image are the same.

17. The image capturing device according to claim 16, wherein when the zooming factor is between 1 and the primary-secondary image factor, the image zooming-warping module enlarges the primary rectified image to generate an enlarged primary rectified image according to the zooming factor, shrinks the secondary rectified image to generate a shrunken secondary rectified image according to the zooming factor, and performs image warping on the enlarged primary rectified image and the shrunken secondary rectified image to generate the primary warped image and the secondary warped image according to the pixel displacements and the pixel depth map, wherein a warping level is associated with the depth map.

18. The image capturing device according to claim 12, wherein the primary lens and the secondary lens have the same fields of view and different distortion levels, wherein the distortion level of the primary lens is much less than the distortion level of the secondary lens, and wherein the image preprocessing module further performs image cropping on a center region of the secondary rectified image to generate a cropped secondary rectified image, and sets the cropped secondary rectified image as the second rectified image.

19. The image capturing device according to claim 18, wherein when the zooming factor is between 1 and the primary-secondary image factor, the image zooming-warping module enlarges the primary rectified image to generate an enlarged primary rectified image according to the zooming factor, shrinks the secondary rectified image to generate a shrunken secondary rectified image, and performs image warping on the enlarged primary rectified image and the shrunken secondary rectified image to generate the primary warped image and the secondary warped image according to the pixel displacements and the depth map, wherein a warping level is associated with the depth map.

20. The image capturing device according to claim 12, wherein the image fusion module sets a first weight and a second weight respectively corresponding to the primary warped image and the secondary warped image according to the zooming factor, performs image fusion on the overlapping regions respectively in the primary warped image and the secondary warped image to generate a fused overlapping image based on the first weight and the second weight, and substitutes the overlapping regions respectively in the primary warped image and the secondary warped image by the fused overlapping image to generate the digital zoomed image.

21. The image capturing device according to claim 12, wherein when the zooming factor is greater than the primary-secondary image factor, the image zooming-warping module further enlarges the secondary rectified image to generate an enlarged secondary rectified image according to the zooming factor, performs image warping on the shrunken secondary rectified image to generate the secondary warped image according to the pixel displacements and the depth map, and sets the secondary warped image as the digital zoomed image, wherein a warping level is associated with the depth map.

22. The image capturing device according to claim 12, wherein when the zooming factor is less than 1, the image zooming-warping module shrinks the primary rectified image to generate a shrunken primary rectified image, performs image warping on the shrunken primary rectified image to generate the primary warped image according to the pixel displacements and the depth map, and sets the primary warped image as the digital zoomed image, wherein a warping level is associated with the depth map.

* * * * *